United States Patent [19]
Ladewig et al.

[11] 3,832,977
[45] Sept. 3, 1974

[54] FEEDING DEVICE
[76] Inventors: Lyle H. Ladewig; Elmer E. Ladewig; Lester G. Ladewig, all of R.R. No. 1, Stockton, Minn. 55988
[22] Filed: May 5, 1972
[21] Appl. No.: 250,523

[52] U.S. Cl............................................. 119/52 R
[51] Int. Cl............................................. A01k 5/00
[58] Field of Search........ 119/52 R, 52 A, 51 R, 53, 119/61, 58

[56] References Cited
UNITED STATES PATENTS

| | | | |
|---|---|---|---|
| 1,346,784 | 7/1920 | Hamilton | 119/52 R |
| 1,491,630 | 4/1924 | Reid | 119/52 R |
| 1,907,349 | 5/1933 | Flanders | 119/52 R X |
| 2,703,069 | 3/1955 | Dueringer | 119/52 R |
| 2,752,640 | 7/1956 | Mazur | 119/52 R X |
| 2,752,885 | 7/1956 | Mazur | 119/52 R |
| 3,053,228 | 9/1962 | Singley | 119/52 R |
| 3,126,872 | 3/1964 | Mazur | 119/52 R |
| 3,205,860 | 9/1965 | Moore | 119/52 R |

Primary Examiner—Hugh R. Chamblee
Attorney, Agent, or Firm—Richard J. Renk

[57] ABSTRACT

An animal feeding device having a wall which tapers outwardly as it progresses downwardly to allow feed to move down with no restriction and provided with in inwardly directed gridwork toward the bottom with an opening therein to permit animals to take feed from the inside of the feeding device.

7 Claims, 14 Drawing Figures

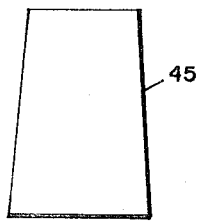
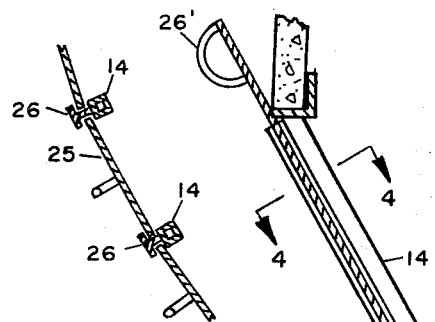
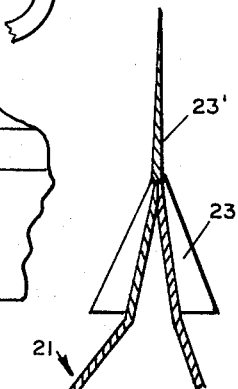
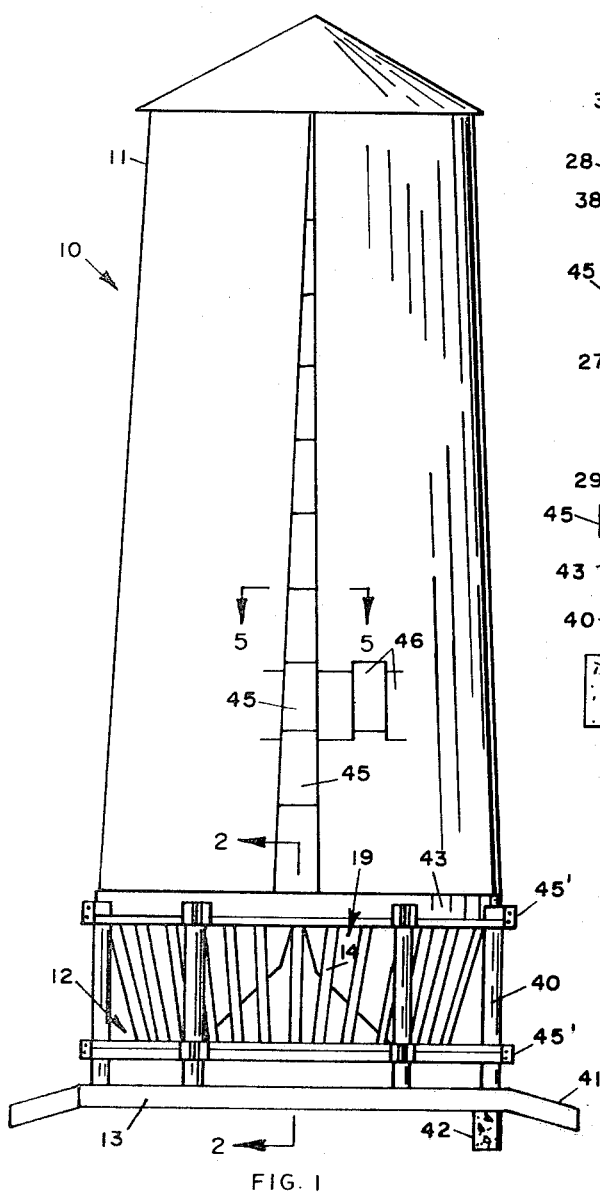
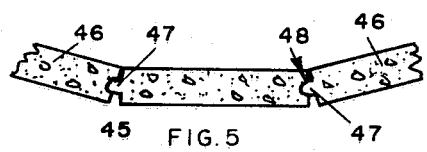

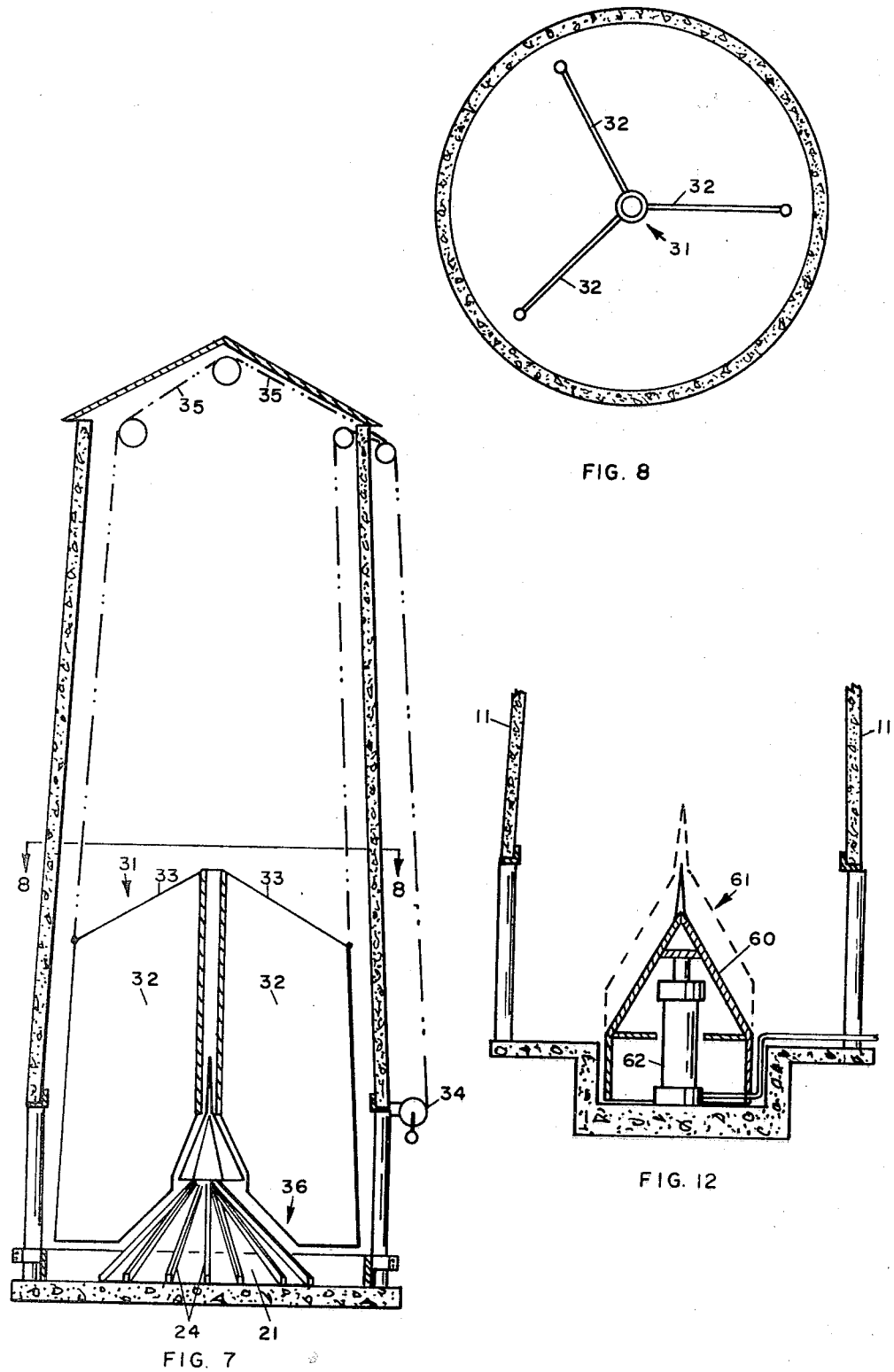

FEEDING DEVICE

BACKGROUND OF INVENTION

Because of the high cost of and shortage of farm labor, more and more effort has been spent in mechanizing animal feeding. Various types of mechanical self-feeders have been developed. However, because of interacting parts, mechanical feeders have been costly to operate because of rust, corrosion, and mechanical break-down problems which are difficult to overcome because of the weather and other adverse conditions under which they operate.

SUMMARY OF INVENTION

The present self-feeding device overcomes the problems of prior feeders by providing a unique feed flow and control system which does not require moving parts during feeding. Specifically, the invention provides an enclosure for holding feed which tapers outwardly as it progresses downwardly to facilitate downward movement of the feed into a unique grid arrangement toward the bottom of the enclosure. The grid has spaced apart members extending inwardly toward the center of the enclosure to allow feed to fall therebetween and also allow animals to get closer to the feed by enabling them to reach inwardly of the enclosure and between the members to extract the feed.

DRAWINGS

FIG. 1 shows one form the invention may take when incorporated in a silo type structure.

FIG. 2 is a fragmentary sectional view taken generally along lines 2 — 2 of FIG. 1 showing the feeding grid arrangement.

FIG. 3 is an enlarged fragmentary view of one of the grid bars and a feed regulating gate which may be used.

FIG. 4 is a sectional view of the feed regulating gate taken along lines 4 — 4 of FIG. 3.

FIG. 5 is a cross-section of a tapered block which may be used in the silo as taken generally along lines 5 — 5 of FIG. 1.

FIG. 6 is an enlarged view of the tapered block.

FIG. 7 is a vertical sectional view of the silo shown in FIG. 1 showing an inner deflector cone for moving the feed toward the feeding grid and a divider for separating the feed into sections as the silo is initially filled.

FIG. 8 is a sectional view taken along lines 8 — 8 of FIG. 7.

DESCRIPTION

Figure 5A:
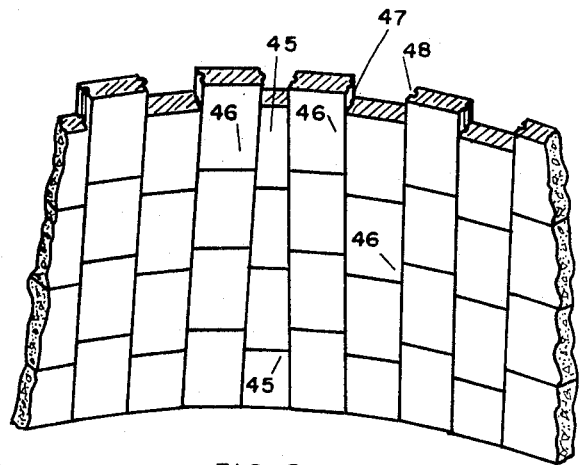
FIG. 5A is another illustration of the interrelationship between the tapered and rectangular blocks.

With reference to FIG. 1, the concepts of the feeding device are shown incorporated in a silo structure 10. The silo 10 includes a hollow feed enclosure 11 including a feeding grid or grate 12 adjacent a bottom 13. The feed enclosure 11 is narrower toward its top and tapers outwardly wider as it progresses downwardly toward the bottom 13.

As shown in FIGS. 1 and 2, the feeding grid or grate 12 includes a series of spaced apart bar members 14 which bow inwardly toward the interior of the enclosure 11. The bars 14 have a somewhat vertically disposed section 15 extending from an angle-iron rim 16 toward the center of the feeding device. Toward the bottom 13, the bars 14 bend outwardly with somewhat of a horizontal section 17 which extends to the top outer periphery of a base wall 18. The base wall 18 extends upwardly from the bottom 13 and confines the feed to keep it from being spread away from the silo by the animals.

To enable feed to be accessible in the interior of the silo, the bars 14 are spaced apart from one another as at 19 (FIG. 1) a distance generally sufficient to enable animals to extend their heads between the bars. The bars serve to hold the feed up as it moves downwardly and also to protect the animals from being hit or smothered with large feed chunks. The inward bowing of the bars together with the base wall 18 serves to form a pocket 20 (FIG. 2) for the feed to nest outside the bar but within the base wall.

Movement of the feed downwardly in the silo is facilitated by the outward taper of the wall so as to eliminate resistance to flow. As the feed approaches the gridwork area, it is also urged outwardly between the bars 14 by a deflector 21 (FIGS. 1 & 2). The deflector 21 may take the form of a frustro-conical base section 22 (FIG. 2) having a series of upwardly pointed blades 23 on its center top to cut the feed as it moves downwardly. A needle point 23' is formed at the very top of the cone. Sliding and breaking up of the feed may also be aided by a series of generally vertically disposed ribs 24 (FIG. 7) on the face of the cone spaced apart around the periphery of the cone. The ribs should preferably have a low friction surface such as chrome plating, nylon, etc.

Depending on the type of feed in the silo, downward movement between the grid bars 14 can also be controlled by sliding gates 25 (FIGS. 3, 4) bridging between the individual bars. Guides 26 formed from "T" or angle iron sections on the outside of the bars 14 allow the gates be slid upwardly or downwardly by handles 26'. The gates may be moved downwardly (to the closed position) when filling the silo to prevent feed from blowing out between the grid spacings 19.

Another feature of the invention which has worked extremely well is the provision of a flexible cover 27 (FIG. 2) around the grid work. The cover 27 of canvas or other material may extend entirely around the gridwork and be secured at the top thereof to the silo wall as at 28. The lower edge 29 having a loose draw string therein is allowed to hang loosely. The cover keeps snow, rain and wind out and keeps silage heat in. At the same time, animals by sticking their noses in toward the silage cause the cover to lift upwardly allowing full access to the feed between the bars.

When filling the silo the draw string may be tightened to tie the cover against the gridwork and act as another barrier against feed blowing and spilling out. Slots (not shown) near the top edge of the cover can be used to allow the feed control gates 25 to be pulled upwardly.

To aid the feed in moving downwardly in the enclosure and spread out from the cone, there may be provided a divider 31 (FIGS. 7 and 8). The divider includes a series of fins 32 radially spaced which have upwardly and inwardly tapered leading edges 33. The edges 33 may be sharpened in a knifelike manner. For larger diameters, the number of fins can be increased.

Divider 31 is started near the bottom of the silo and moved upwardly as the silo is filled thereby causing a division in the feed into sections allowing for easier deflection off of the cone 21. This is accomplished by moving the divider by means of a winch 34 coupled to a cable arrangement 35. For purposes of illustration the cables are shown secured to the outer edge of the fins 32. The lower edge of the fins are notched as at 36 (FIG. 7) to nest over the deflector cone 21 and its knife-blades 23 in the lowermost position. While three fins are shown, more or less may be used to suit the type of feed being fed.

For purposes of supporting the silo wall above the gridwork 12, the angle-iron rim 16 has a vertical inside flange 37 (FIG. 2) to confine the blocks from spreading inwardly and a horizontal flange 38 serving as a support base. Tie bands 39 extend around the outside of the blocks to hold the blocks in engagement with the rim. A similar angle-iron rim may be used around the bottom of the gridwork to which the bars may be welded. Vertical posts 40 extend from the silo bottom 13 to the upper rim 16 to complete the wall support. The posts can be metal or concrete.

A cement pad 41 tapering downwardly away from the bottom 13 may be used to keep dropped feed and manure gradually moving away from the feeding area. For further support, individual column footings 42 may be used under the post areas. A solid ring footing may also be used.

To further control spilling and spreading out of feed as it moves downwardly into the grid area and during feeding, there may be provided an upper ring shroud 43 and a lower ring shroud 44. The shrouds are moveable upwardly and downwardly by loosening individual clamps 45' (FIG. 2) which are guided on the posts 40. The upper shroud 43 (shown in its uppermost position in FIG. 1) keeps the feed from spreading out too quickly as it initially enters the gridwork area, while the lower shroud 44 (shown in its lowermost position) acts as a dam to catch the feed near the bottom outer edge of the grid and also prevents the animals from easily spreading feed away from the feeding area. One or both shrouds may be used depending on feeding conditions.

A novel means of achieving the tapered silo wall is shown in FIGS. 1, 5 and 6 wherein a series of trapezoidally shaped blocks 45 are used to form vertically extending wedge-like sections in the silo wall. Conventional silo blocks 46 are used in abutting relation to the tapered blocks 45.

Figure 1A:
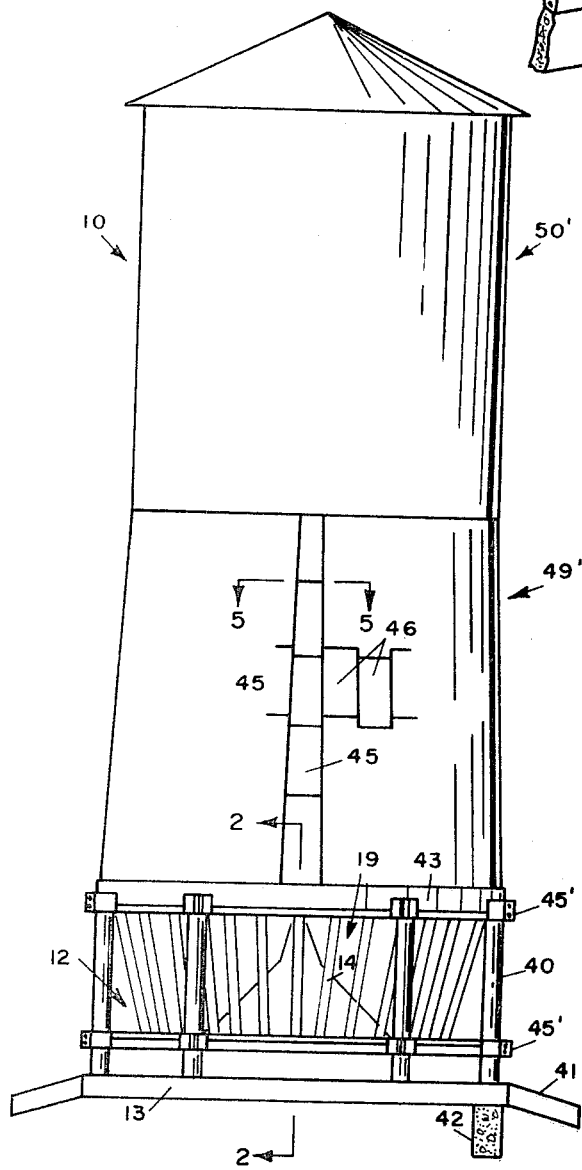
FIG. 1A shows another form the invention may take with a frusto-conical lower section and a cylindrical upper section.

As shown in FIG. 1, the individual tapered blocks 45 get progressively smaller in each row as they extend from bottom to top. In other words, the top of a block on a lower layer is as wide as the bottom on the layer directly above it, etc. In FIG. 5 it is shown how the blocks have a tongue section 47 along one vertically disposed edge and a groove 48 along the other vertical edge to provide mating engagement with adjacent lateral blocks. The conventional blocks 46 have the same mating tongue and groove sides. Depending on the degree of taper required in the silo wall, any number of tapered wedge sections may be used. One successful silo was made with three sections equally spaced around the silo. As another means of construction, a silo can be made with a frustro-conical wall section 49' (FIG. 1A) extending a pre-determined distance above the gridwork, after which, the frustro-conical section is topped with a conventional straight cylindrical silo wall 50' for a pre-determined distance to the roof. This will also perfect a non-mechanical seal as well as allowing for more storage. It also provides for setting a pre-determined roof size.

Figure 10:
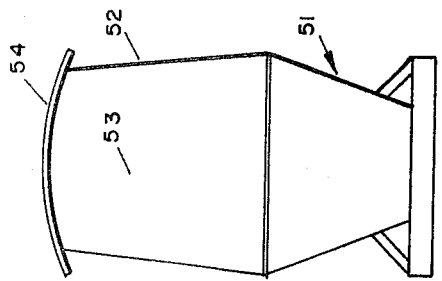
FIG. 10 is an end view of the embodiment of FIG. 9.
Figure 9:
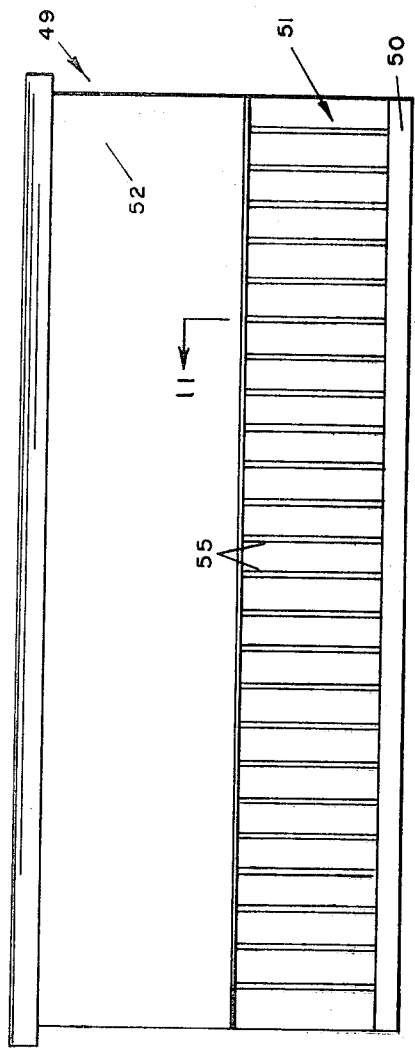
FIG. 9 shows another embodiment of the invention.
Figure 11:
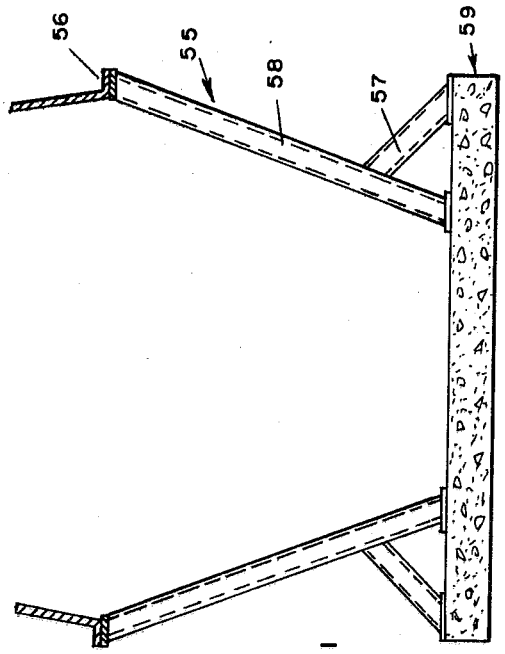
FIG. 11 is a partial sectional view taken along lines 11 — 11 of FIG. 9.

Another embodiment of the invention is shown in FIGS. 9 – 11 which differs from that shown in FIG. 1 by incorporating the features of the invention in a rectangular type feeder. The feeder includes a rectangular enclosure indicated at 49 having a bottom 50, a gridwork feeder section 51, longitudinal walls 52 which taper outwardly toward the base, end walls 53, and a top 54.

The gridwork includes a series of spaced apart bar members 55 extending from a point closely adjacent the bottom 56 of the tapered longitudinal walls inwardly and downwardly toward the center of the enclosure. In this embodiment the lowermost and somewhat horizontally disposed section of the bars is formed by a member 57 which butts into the more vertically disposed section 58 and extends downwardly and outwardly to a point adjacent the outer rim of the bottom 59. If the rectangular feeder is relatively narrow it is not necessary to provide a deflector in the center of the feeder since the cattle can extend their heads between the bars to obtain feed near the center. However, if necessary, a deflector may be used.

While the preferred forms of the invention have been shown in the drawings, it is to be understood that the feeders may take other forms and still be within the scope of the invention. For example, while the cover 27 is shown to extend the outside of posts 40, it may pass to the inside of the posts. Likewise, in some instances where there are sufficient divider fins, there may not be a need for the knives on the deflector cone.

As an added feature to the embodiment shown in FIGS. 1 – 8, a means of sealing the silage against air spoilage is shown in FIG. 12. In this concept the deflector cone indicated at 60 may be mounted for vertical movement to the dotted line position 61 by a suitable means such as a hydraulic or air cylinder 62. Upward movement of the cone 60 causes the silage to lift and wedge out so as to seal against the side wall 11.

From the above, it is believed obvious that the selffeeders of the invention once filled are free of any mechanical action devices which are so troublesome in farm operation. In addition, the amount of labor involved is drastically reduced since once the feeder is filled no further labor is required.

What we claim is:

1. An animal feeding device comprising,
  a base
  a gridwork feeding section mounted above said base,
  an enclosure for containing feed extending above said gridwork,
    said enclosure having a frustro-conical wall area which tapers inwardly as it progresses upwardly so as to be wider at the lower portion thereof than at its top, said frustro-conical wall area having means including tapered blocks to produce said inward taper, said gridwork including a plurality of fixed members extending in a generally vertical direction and spaced apart for access to feed in said enclosure so animals can extract feed from the spaces between said members, said members extending from a point adjacent a wider portion of said enclosure and downwardly and inwardly toward the center of said enclosure with the spaces between said members extending from adjacent said wider portion of said enclosure so as to allow feed to have a substantially unobstructed vertical flow path between said members as it moves downwardly from the wider portion of said enclosure.

2. An animal feeding device as claimed in claim 1, wherein said gridwork has a plurality of members spaced apart a distance sufficient to allow the heads of the animals to extend between the bars.

3. An animal feeding device as claimed in claim 1, wherein said means also includes rectangular blocks.

4. An animal feeding device as claimed in claim 1, wherein said group of tapered blocks forms a wedge-like section of gradually decreasing width in the wall of said enclosure.

5. An animal feeding device as claimed in claim 1, wherein said enclosure has a portion adjacent said gridwork which is frustro-conically shaped and portion which is cylindrically shaped above the frustro-conically shaped portion.

6. An animal feeding device as claimed in claim 1, wherein a pliable cover extends on the outside of said gridwork and is attached to said feeding device with its lower end loose to allow animals to move it and gain access to the feed in said enclosure.

7. An animal feeding device as claimed in claim 1 wherein moveable deflecting means are provided adjacent said gridwork for sealing the silage against spoilage.

* * * * *